Sept. 2, 1952 R. D. SLAYTON 2,609,445

ELECTRONIC CONTROL CIRCUIT FOR RECORDERS

Filed June 12, 1951 5 Sheets-Sheet 1

FIG. I

INVENTOR
RANSOM D. SLAYTON
BY Emery Robinson
ATTORNEY

ELECTRONIC CONTROL CIRCUIT FOR RECORDERS

Filed June 12, 1951 5 Sheets-Sheet 2

INVENTOR
RANSOM D. SLAYTON
BY Emery Robinson
ATTORNEY

ELECTRONIC CONTROL CIRCUIT FOR RECORDERS

Filed June 12, 1951 5 Sheets-Sheet 3

INVENTOR
RANSOM D. SLAYTON
BY Emery Robinson
ATTORNEY

Sept. 2, 1952 R. D. SLAYTON 2,609,445

ELECTRONIC CONTROL CIRCUIT FOR RECORDERS

Filed June 12, 1951 5 Sheets-Sheet 4

INVENTOR
RANSOM D. SLAYTON
BY Emery Robinson
ATTORNEY

Sept. 2, 1952 R. D. SLAYTON 2,609,445

ELECTRONIC CONTROL CIRCUIT FOR RECORDERS

Filed June 12, 1951 5 Sheets-Sheet 5

INVENTOR
RANSOM D. SLAYTON
BY Emery Robinson
ATTORNEY

Patented Sept. 2, 1952

2,609,445

UNITED STATES PATENT OFFICE 2,609,445

ELECTRONIC CONTROL CIRCUIT FOR RECORDERS

Ransom D. Slayton, Elmhurst, Ill., assignor to Teletype Corporation, Chicago, Ill., a corporation of Delaware Application June 12, 1951, Serial No. 231,071

19 Claims. (Cl. 178—17)

Figure 1:
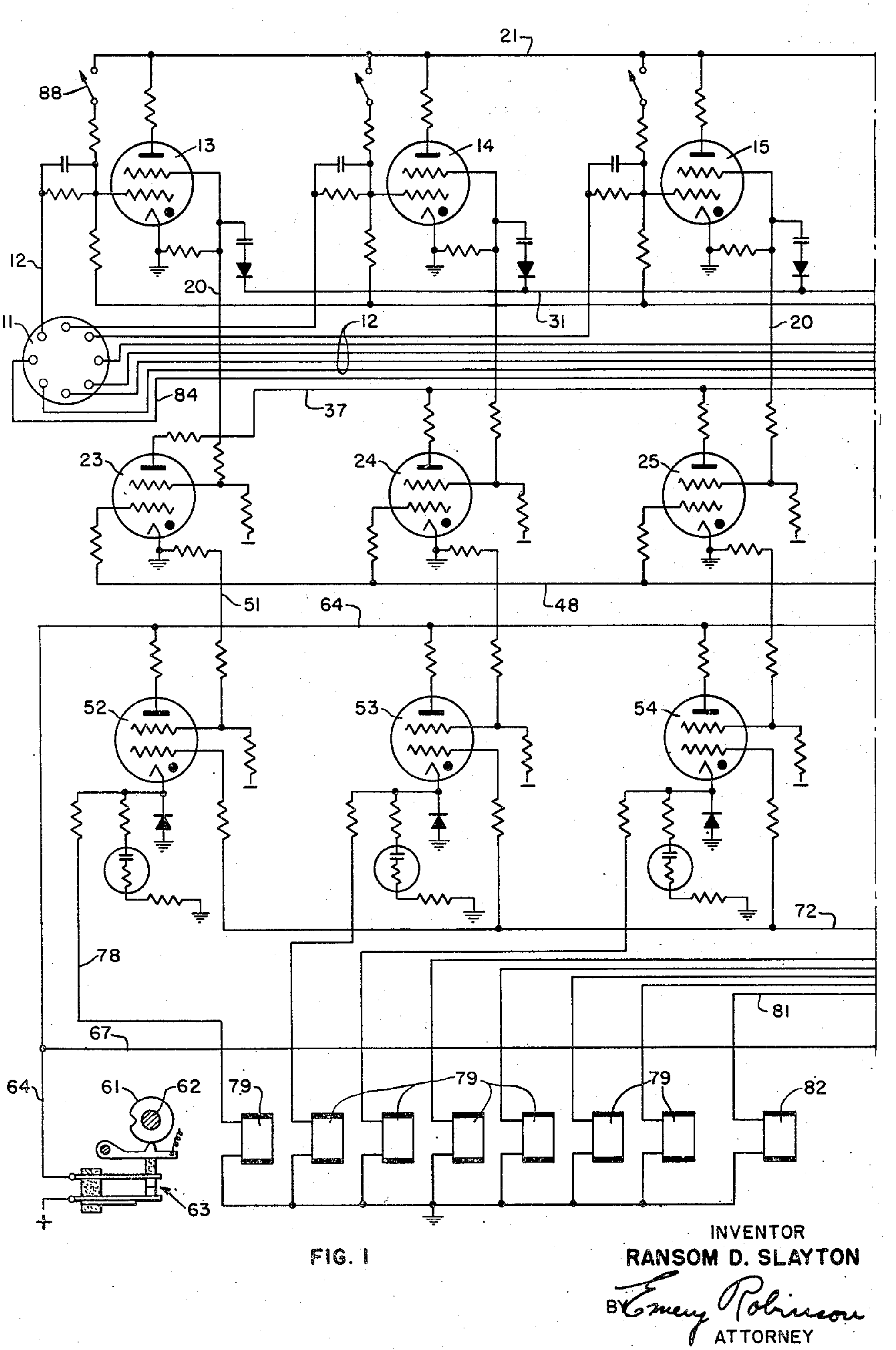

The present invention pertains to control circuits and more particularly to control circuits utilized with high speed recorders.

Many control circuits are utilized in the prior art in conjunction with standard recorders and usually include relay or condenser storage devices. However, with the previously utilized devices the speed of operation is not very great, but, in the telegraph field, generally is of the order of sixty to seventy-five words per minute, where one word consists of five alphabetical characters or numerals and one space character.

The present invention may be designed to operate with high speed perforating devices, such for instance as that disclosed in co-pending application Serial No. 148,797, filed on March 10, 1950, in the name of W. J. Zenner. Such perforating apparatus is designed to achieve efficient performance at speeds of between six hundred and sixteen hundred words per minute. As a result of such high speed operation the prior known control circuits including the storage devices mentioned above will not permit satisfactory operation.

Accordingly, an object of the present invention is to provide a control circuit for utilization with a high speed perforator operating in excess of six hundred words per minute.

A second object of the invention is to provide a control circuit for recorders which utilizes electronic means as greatly as possible.

A further object of the invention is to provide a control circuit for the purpose described which will necessitate a minimum of maintenance and replacement of parts.

The instant control circuit is in some aspects similar to the control circuit of my co-pending application Serial No. 177,791, filed on August 5, 1950. However, in the latter disclosure all impulses of a single character must be received within a single cycle of the perforator, whereas in the instant disclosure this is not always necessary.

Accordingly, a still further object of the invention is to provide a control circuit responsive to random signal impulses.

Still further objects of the invention will become apparent during the following description of the apparatus.

The present invention comprises generally a series of gas tubes for receiving from some suitable source permutations of code signal elements indicative of the characters or information to be perforated. The received signals are in turn stored in a plurality of gas storage tubes through operation of a transfer circuit. It might be noted at this point that the receiving tubes and storage tubes are equal in number to the components or element positions of the particular code being utilized. Accordingly, while seven positions have been indicated in the instant disclosure representative of a 7-unit code it is of course obvious that the device will operate satisfactorily for a code utilizing a greater or less number of units. The selection stored in the gas storage tubes will be transferred at a suitable time under the control of the continuously operating perforating equipment to a series of output gas tubes. The output gas tubes in turn control a plurality of perforator control magnets which operate to allow the perforation of the desired character in the recording medium. The device also includes a tape feed control for stepping the tape or recording medium at the desired time and an overlap circuit so that the device will function to allow perforating of a particular character even though the receipt of signals in the storage devices and the transfer thereof may be early or late with respect to the control from the perforating equipment. Further, provision is made for blank recognition and for receiving random signal impulses.

Figure 2:
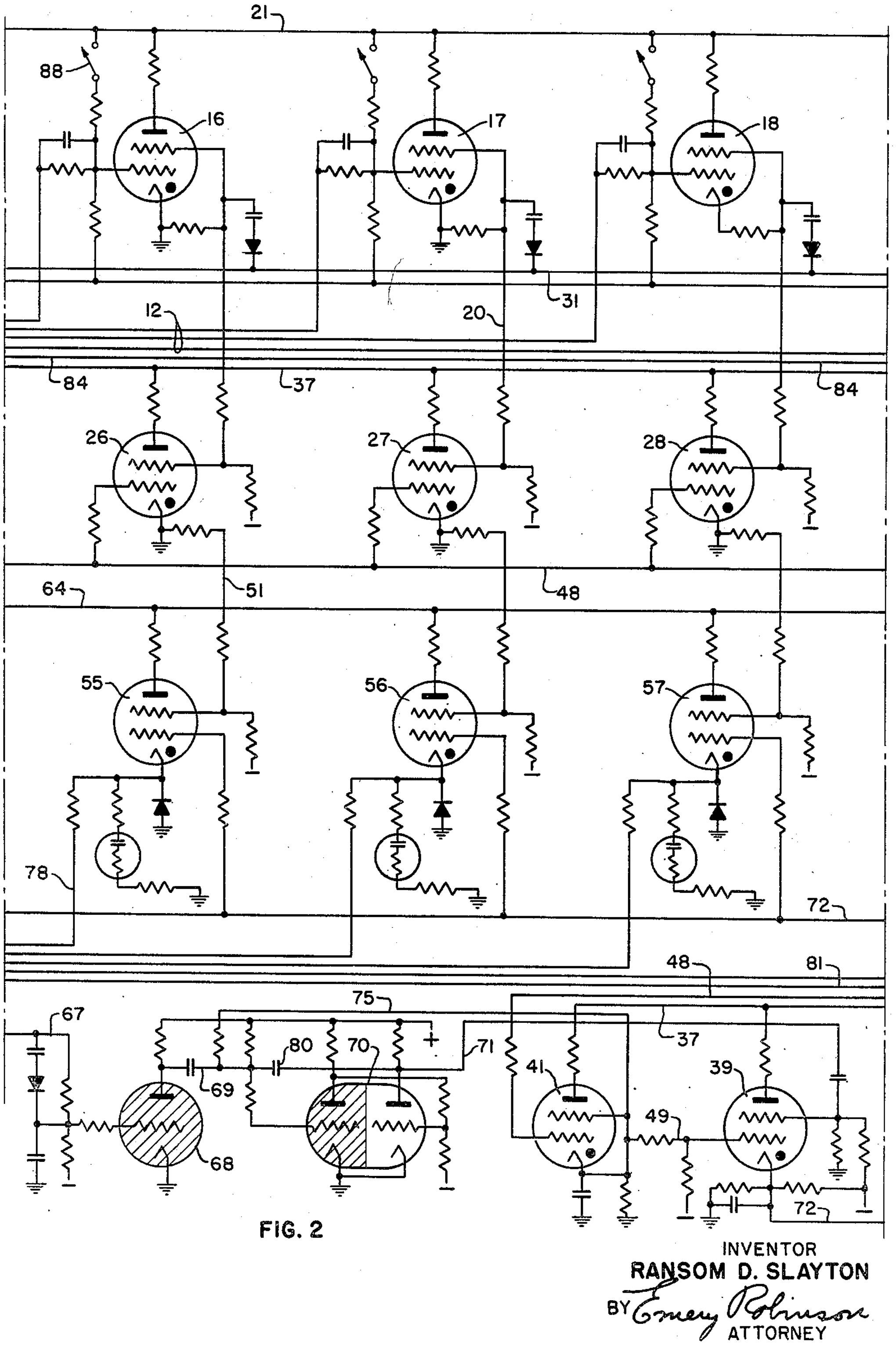
Figure 3:
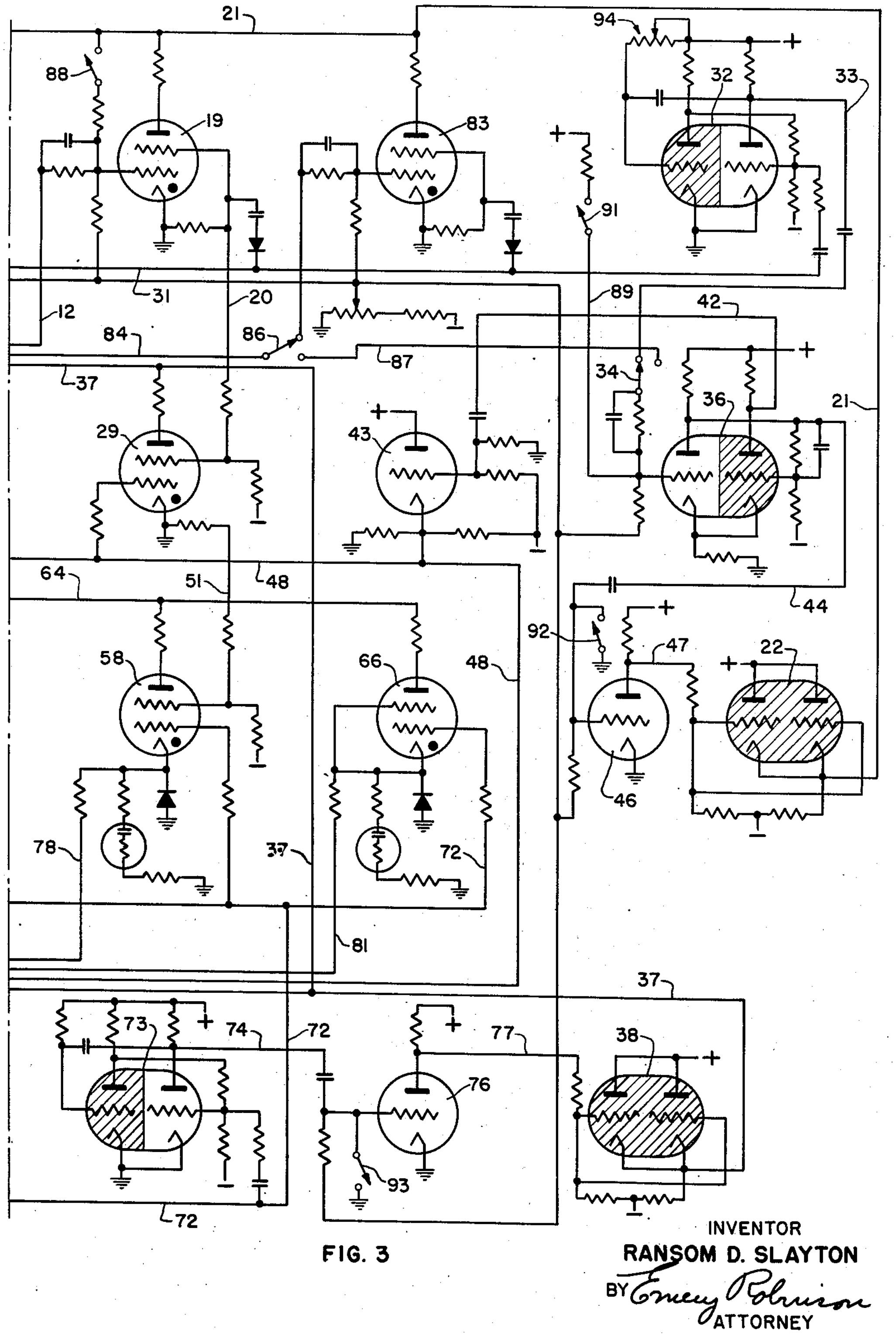
Figure 5:
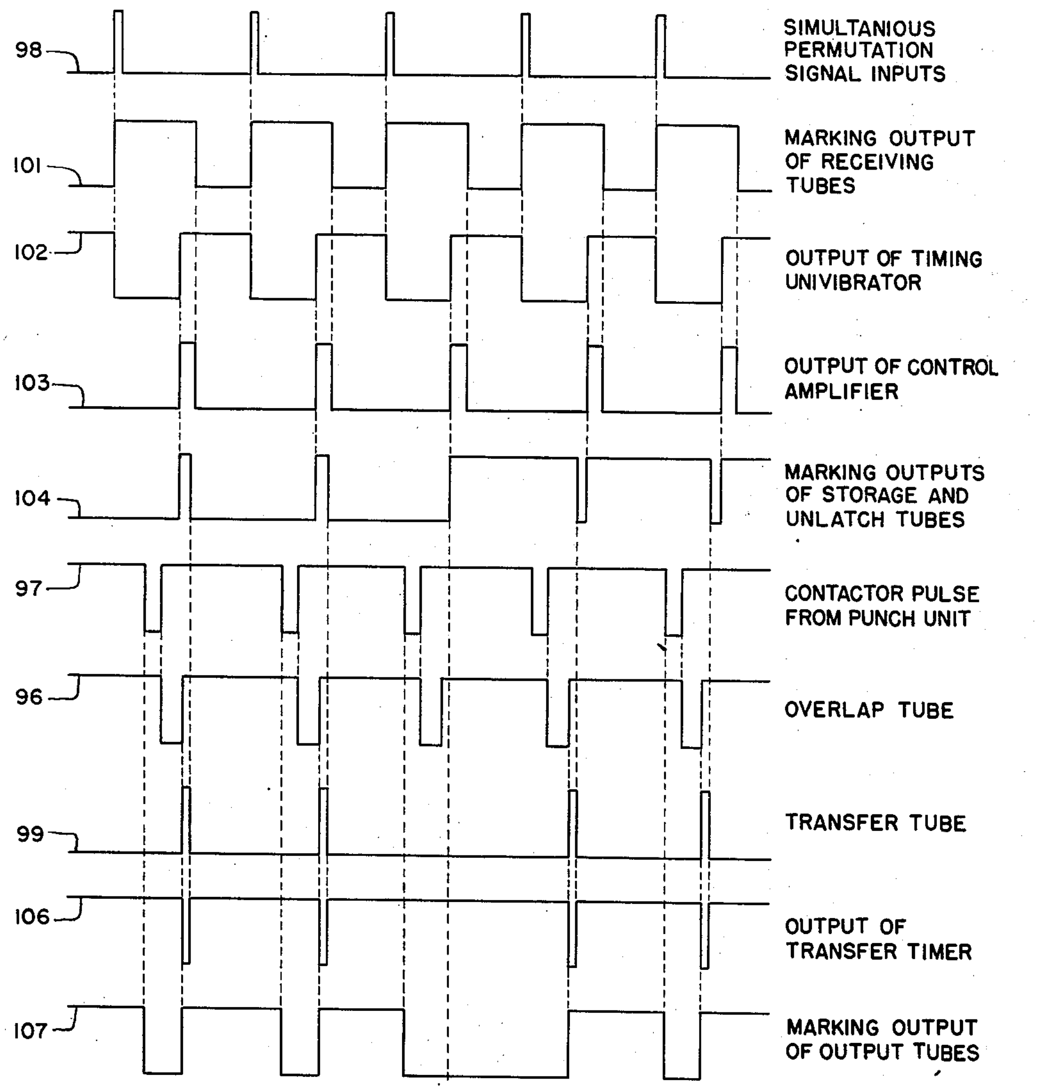
Figure 4:
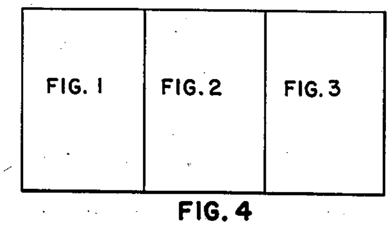
Figure 6:
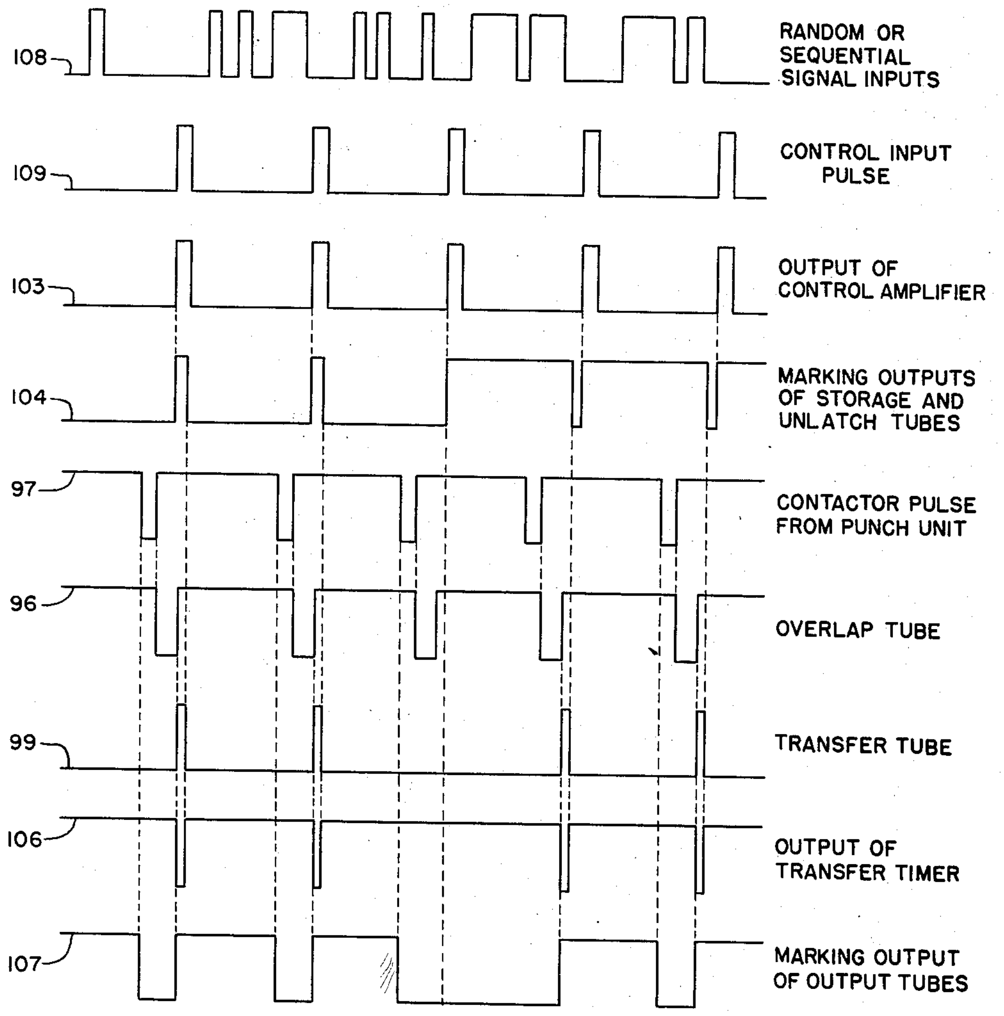

A more complete understanding may be had of the invention when the following detailed description thereof is read in conjunction with the accompanying drawings in which:

Figs. 1–3, inclusive, illustrate schematically the components forming the present invention;

Fig. 4 is a block diagram illustrating the proper arrangement of Figs. 1–3, inclusive, to form an operative apparatus; and Figs. 5 and 6 are timing diagrams illustrating diagrammatically the various intervals of operation of certain of the components with respect to each other, Fig. 5 showing simultaneous code impulse reception and Fig. 6 showing random signal impulse reception timing.

At the outset of the description it should be noted that the instant invention is being described as operating in conjunction with the invention disclosed and described in the above mentioned patent application to Zenner, which is incorporated as a portion hereof. Accordingly, only as much of the perforating equipment will be disclosed in this application as to permit a complete understanding of the invention.

Referring now to Fig. 1, it may be seen that a connector 11 is provided, which connector will be in operative cooperation with a suitable source of permutation code signals being received at a high rate of speed. The connector 11 is provided with seven conductors 12, each of which is assigned to a particular element or impulse position of a 7-unit code signal. In the event that a 5-unit code were to be utilized only five conductors 12 would be present, in place of the seven, etc. for various other codes.

The conductors 12 are connected through suitable resistor-condenser paralleled circuits to the normally negatively biased control grids of a series of normally non-conducting gas receiving tubes 13 to 19, inclusive. The screen grids of the tubes 13 to 19, inclusive, are at cathode potential, and thus the tubes are under the sole control of the control grids as far as conduction is concerned. The anodes of the tubes 13 to 19, inclusive, are connected to a common conductor 21 which supplies operating potential from the cathodes of a twin vacuum triode 22, both portions of which are conducting normally. The tube 22 is in effect a cathode follower and conducts during the operation of the apparatus except at such time as it is desired to release the selection in the tubes 13 to 19, inclusive, as will appear hereinafter.

In the event that a marking impulse is impressed to the connector 11, it will appear as a positive potential on the particular conductor 12 according to its position in the code signal designation. Such positive impulse, if it be assumed to appear on the conductor 12 associated with the tube 13, will cause the normal negative bias on the control grid thereof to be raised to a positive value allowing, assuming anode potential to be present, the tube 13 to be rendered conducting.

At substantially the instant that the tube 13 is rendered conducting a positive potential impulse from its cathode circuit will be impressed over a connecting conductor 20 and through an appropriate resistor to the normally negatively biased screen grid of an associated storage gas tube 23. The main function of the tube 13 is to receive the input signals and to release the control circuit for further operation. The tube 23 will not conduct at this time, as it requires an operating potential on its control grid, as will be described hereafter.

The above description is by way of example only and it should be understood that in the event that a positive impulse is present for any of the remaining 6-units of the code signal the receiving tubes 14 to 19, inclusive, will operate similarly from their cathode output circuits over connecting conductors 20 to their associated gas storage tubes 24 to 29, inclusive, respectively, to condition them for operation.

The cathode output circuits of the tubes 13 to 19, inclusive, are also connected to a common conductor 31, through suitable condensers and rectifiers. The conductor 31 is connected, through a suitable resistor and condenser, to the normally negatively biased grid of the right-hand portion of a twin vacuum triode tube 32. The two portions of the tube 32 form a one-shot multivibrator or univibrator, the operation of which will be described generally hereinafter. It might be noted that the left-hand portion of the tube 32 is normally conducting and the right-hand portion normally nonconducting.

The anode circuit of the right-hand portion of the tube 32 is connected by a conductor 33 which includes a suitable resistor and condenser and a manually operable switch 34 to the normally negatively biased grid of the normally nonconducting left-hand portion of a twin triode tube 36. The twin triode tube 36 serves as a control amplifier, as will be described hereinafter.

The anodes of the tubes 23 to 29, inclusive, are connected over a common conductor 37 to the cathodes of a twin vacuum triode 38, both portions of which are conducting normally. The tube 38 is in effect a cathode follower and conducts normally during the operation of the apparatus except at such time as it is desired to release the selection in the tubes 23 to 29, inclusive, as will appear hereinafter. The common conductor 37 also extends through suitable resistors to the anode of a gas output transfer tube 39 and to the anode of a gas unlatch tube 41.

The anode circuit of the right-hand portion of the control amplifier tube 36 is connected by means of a conductor 42 through a suitable condenser to the normally negatively biased grid of a normally nonconducting storage transfer vacuum triode tube 43.

The anode circuit of the left-hand portion of the tube 36 is connected by a conductor 44 through an appropriate condenser to the normally negatively biased grid of a normally nonconducting receiving release driver vacuum triode tube 46.

The anode circuit of the tube 46 is connected to positive potential and by a conductor 47 through a suitable resistor to the normally negatively biased grids of both portions of the receiving release tube 22. It might be noted at this point that in the event that the tube 46 were to be conducting the potential on the conductor 47 would drop to a value at which the twin triode 22 would be rendered nonconducting, and so no anode potential would be supplied to the receiving tubes 13 to 19, inclusive.

The control grids of the tubes 23 to 29, inclusive, are connected to a common conductor 48 which is also connected to the cathode circuit of the tube 43. Thus, in the event that the tube 43 is conducting potential will be applied to the conductor 48 to supply operating potential for the tubes 23 to 29, inclusive, and those of the tubes 23 to 29 will be rendered conducting which receive conditioning potential over the conductors 20 at that time. The conduction of the tube 43 will be described with the operation of the entire control circuit.

The common conductor 48 extends beyond its connection with the cathode of the tube 43 to also connect through a resistor to a control grid of the normally nonconducting gas unlatch tube 41. The screen grid of the tube 41 is at cathode potential, while the anode is connected to the common conductor 37, mentioned previously as electrically connecting the anodes of the storage tubes 23 to 29, inclusive. Thus, assuming anode potential present, the rendering conducting of the tube 41 will be under the sole control of the control grid potential.

The cathode output circuit of the tube 41 is connected over a conductor 49 through appropriate resistors to the normally negatively biased control grid of the tube 39.

The output circuits of the tubes 23 to 29, inclusive, are connected over individual conductors 51 and through appropriate resistors to the normally negatively biased screen grids of a plurality of normally nonconducting output gas tubes 52 to 58, inclusive. However, because of the normal negative bias on the control grids of these tubes, at this time the positive potential impressed upon the screen grids will not be sufficient in itself to allow any of the tubes to become conducting, but instead will act as a conditioning potential only.

If reference is again made to Fig. 1, it may be seen that a cam 61 is provided secured to a shaft 62. The shaft 62 operates continuously under the control of the perforating mechanism and when the instant invention is utilized with the perforator of the above mentioned Zenner application it will correspond to the shaft 28 therein. The cam 61 controls a contact pair indicated generally by the numeral 63, so that during each complete revolution of the shaft 62 the contact pair 63 will be opened momentarily. It might be noted that the operation of the shaft 62 and thus the contact pair 63 is irrespective of the receipt of input signals on the conductors 12 but instead is under the sole control of the continuously operating perforating mechanism.

The contact pair 63 is connected on one side to positive battery over an obvious circuit and on the other side over a common conductor 64 and through individual resistors to the anodes of the tubes 52 to 58, inclusive, and to the anode of a tape feed gas tube 66. A branching conductor 67 extends from the common conductor 64 through suitable resistors to the grid of a vacuum pulse amplifier triode tube 68. The tube 68 is normally conducting, during the interval that the contact pair 63 is closed.

The anode circuit of the tube 68 is connected by a conductor 69 through a suitable resistor and condenser to the grid of the left-hand normally conducting portion of a twin overlap vacuum triode tube 70. The same circuit is also connected by a conductor 75 to the output circuit of the tube 41 through a resistor. A condenser 80 is provided for timing the nonconducting interval of the left-hand portion of the tube 70, as will be described hereinafter.

The anode circuit of the normally nonconducting right-hand portion of the tube 70 is connected by a conductor 71 to the normally negatively biased screen grid of the tube 39.

The cathode output circuit of the tube 39 is connected over a conductor 72 through a condenser and resistor to the normally negatively biased grid of the normally nonconducting right-hand portion of a transfer timer vacuum twin triode tube 73. The conductor 72 also extends through individual resistors to the control grids of the output tubes 52 to 58, inclusive, and the tape feed tube 66.

The anode circuit of the right-hand portion of the tube 73 is connected by a conductor 74 through a suitable condenser to the normally negatively biased grid of a normally nonconducting storage release driver vacuum triode tube 76.

The anode circuit of the tube 76 is connected to positive potential and by a conductor 77 through a suitable resistor to the normally negatively biased grids of both portions of the tube 38.

The cathode output circuits of the output tubes 52 to 58, inclusive, are connected through a suitable resistor and over individual conductors 78 to the windings of associated punch magnets 79. The opposite side of the windings of the magnets 79 are grounded over an obvious circuit. A grounded neon lamp is placed in the output cathode circuit of each of the tubes 52 to 58, inclusive, so that visual observation may be made of the condition of the tubes.

The cathode output circuit of the tape feed magnet 66 is connected through a suitable resistor and over a conductor 81 to the winding of a feed punch magnet 82, the opposite side of which is grounded. A neon lamp is also in the cathode circuit of the tube 66, for a purpose similar to above.

A gas operate tube 83 is provided which has its anode circuit connected through a resistor to the common conductor 21 and its cathode circuit connected to the common conductor 31. A conductor 84 from the connector 11 is connected through a manually operable switch 86 to the normally negatively biased control grid of the tube 83, the screen grid of which is at cathode potential. The tube 83 is provided so that, under one form of operation of the control circuit, blank signals may be recognized and the medium in the punching mechanism stepped accordingly. Also, under the same form of operation it may be utilized to assure operation of the control circuit, all in a manner as will be described.

The conductor 84 may be connected by virtue of an alternate setting of the switch 86 to connect over a conductor 87 and with an alternate setting of the switch 34 with the grid of the left-hand portion of the tube 36. With the switches 86 and 34 in such alternate settings the control circuit may be utilized for its second form of operation, to receive and operate on random signals, all as will be described hereinafter. The switches 86 and 34 are preferably interconnected so that they may be operated simultaneously.

The control grid circuits of each of the receiving tubes 13 to 19, inclusive, are provided with manually operable push button switches 88. The switches are at positive potential and are provided to permit manual setting or operation of the perforating mechanism through the instant control circuit, as will be described hereinafter. In order for such operation to occur the grid of the left-hand section of the tube 36 is connected over a conductor 89 and through a manually operable push button switch 91 to positive potential. The switch 91 will be closed at momentary intervals only during the manual setting of the apparatus.

The grid of the tube 46 is provided with a connection through a manually operable switch 92 to ground, for a purpose to be described hereinafter. The switch 92 is open normally.

The grid of the tube 76 is also provided with a connection through a manually operable switch 93 to ground, for a purpose also to be described hereinafter. The switch 93 is open normally.

The grid circuit of the left-hand portion of the univibrator tube 32 is provided with an input signal timing potentiometer indicated generally by the numeral 94. The operation of the device will be more understandable in the description of the circuit, but it is provided to allow adjustment of operation in accordance with the signal receiving interval in simultaneous reception.

In the following operational description of the control circuit the operation will first be described with the switches 86 and 34 in their left-hand position, an shown on Fig. 3. Also, the initial description will not include the function of the tube 83, but its use in the circuit with the same switch setting will be described separately.

If it be assumed that a signal is received in the receiving tubes 13 to 19, inclusive, which has at least one impulse marking, one or more of the tubes 13 to 19 will be rendered conducting (assuming anode potential present). Upon one or more of such tubes becoming conducting potential will appear on the common conductor 31 and will be impressed through the differentiating condenser as a single positive impulse to the grid of the right-hand portion of the tube 32. The tube 32 is a one-shot multivibrator, and in accordance with its known operation the right-hand portion will become conducting and the left-hand portion will be rendered nonconducting for a predetermined interval, after which the two portions will return to their initial conditions.

During the interval that the right-hand portion of the tube 32 is conducting its anode potential will decrease, and a negative condition will exist on the conductor 33. However, when the two portions of the tube 32 resume their initial conditions the anode potential of the right-hand portion will increase, causing a positive impulse to be impressed to the grid of the left-hand portion of the tube 36 over the conductor 33. This will result in the left-hand portion of the tube 36 being rendered conducting momentarily.

As the left-hand portion of the tube 36 becomes conducting its anode potential drops, resulting in a negative condition on the conductor 44. This, however, has no effect on the tube 46 at this time, as it simply drives the negative grid potential to a lower value. However, the drop in anode potential will result in the right-hand portion of the tube 36, which is normally conducting, being rendered nonconducting, through the interconnection of the anode and grid circuits.

Upon the right-hand portion of the tube 36 being rendered nonconducting its anode potential will increase, causing a positive impulse to be impressed to the grid of the tube 43 over the conductor 42. The tube 43 will be rendered conducting momentarily.

During the interval that the tube 43 is conducting its cathode output circuit will impress positive potential on the common conductor 48 to the control grids of the gas storage tubes 23 to 29, inclusive. At this time if the screen grids are receiving conditioning positive potential from the conductors 20 the tubes 23 to 29 receiving such conditioning potential will be rendered conducting, indicating a marking condition in the corresponding gas receiving tubes 13 to 19. Once the tubes 23 to 29 are rendered conducting they will continue to conduct irrespective of the potential on the control and screen grids. The received signal condition will thus be stored in the tubes 23 to 29, inclusive.

The instant description is predicated on the receipt of all the signal impulses in the receiving tubes 13 to 19 being substantially simultaneous. However, it is possible that with particular types of signal sources there may be some interval of time between the receipt of all of the impulses of a character, but yet within a margin that can be handled by the control circuit. In such a case it is desirable that the operation of the tube 43 and the subsequent transfer of the signals from the receiving tubes 13 to 19 to the storage tubes 23 to 29 does not occur too quickly, so that one or more impulses will be lost and an incorrect signal perforated. In order to provide for such a condition, within certain limits, the timing potentiometer 94 has been included in the grid circuit of the left-hand portion of the tube 32, which is manually settable to allow for various signal receipt time intervals. It serves the purpose of altering the time required for the univibrator tube 32 to regain its normal condition, after being triggered, at which time the tube 36 is reversed in conduction and the tube 43 is rendered conducting. Thus, the operating time, that is initially, of the tube 43 may be controlled to assure storage of the complete character.

The left-hand portion of the tube 36 will conduct momentarily only, after which it will be rendered nonconducting by the negative bias on its grid. At this time its anode potential will increase and a positive impulse will be impressed over the conductor 44 to the grid of the tube 46, causing it to be rendered conducting. This, in turn, causes the anode potential of the tube 46 to decrease, with a similar decrease in potential on the conductor 47. The potential on the conductor 47 will drop to a sufficiently low value to allow the negative bias on the grids of the tube 22 to assert control, thus causing both portions of the tube 22 to be rendered nonconducting.

At such time as the two portions of the tube 22 is rendered nonconducting no positive potential will be impressed to the common conductor 21 and so no further anode potential will be present to sustain conduction in any of the receiving tubes 13 to 19, which may have been conducting due to the receipt of a marking signal impulse. Thus, if not in that condition, all of the tubes 13 to 19 will be rendered nonconducting, in readiness to receive the succeeding signal character. The tube 46 will be rendered conducting momentarily only, with the tube 22 rendered nonconducting for a similar interval. Thereafter, normal conditions will again exist in the two tubes and anode potential will be again supplied to the tubes 13 to 19, inclusive.

The manually operable switch 92 is provided in the grid circuit of the tube 46 to allow that tube to be rendered conducting manually by closing the switch and so placing the grid at ground potential. This, of course, will result in the tube 22 being rendered conducting, with similar results to those described above. The switch 92 is provided because in some instances, particularly when the apparatus is placed in operation, it becomes necessary to render one or more of the tubes 13 to 19 nonconducting.

During the interval that the tube 43 is conducting potential is not only impressed to the control grids of the tubes 23 to 29, but also over branching conductor 48 to the control grid of the unlatch tube 41. As the screen grid of this tube is at cathode potential the tube 41 will be rendered conducting, assuming anode potential to be present. The tube 41 is of the gas variety, and so will continue to conduct after positive potential is no longer applied to its grid.

Once the tube 41 is rendered conducting positive potential will be impressed from its cathode circuit over the conductor 49 to the control grid of the tube 39. However, because of the negative bias on the screen grid of this tube it will not be rendered conducting by this potential only, but the same will serve as a conditioning potential.

Mention was made previously of the cam 61 on the shaft 62 and the fact that it rotated continuously under the control of the perforator and irrespective of the receipt of signals in the control circuit. If it now be assumed that the cam 61 is in position where the low portion thereof is presented to the follower the contact pair 63 will be opened momentarily. At this time positive potential will no longer be impressed through the contact pair 63 and over the conductor 64 and branching conductor 67 to the grid of the tube 68. This will cause the tube 68 to be rendered nonconducting momentarily.

Also, with the contact pair 63 open anode potential will no longer be supplied over the conductor 64 to the output tubes 52 to 58, inclusive, and the feed tube 66, thus causing any of those tubes which may have been conducting to be rendered nonconducting. The apparatus is thus ready for a transfer, as will appear hereinafter.

Upon the tube 68 becoming nonconducting its anode potential will rise and will be impressed over the conductor 69 to the grid of the left-hand portion of the tube 70. However, as this portion of the tube 70 is already conducting it will have no affect thereon.

At such time as the contact pair 63 is closed following the momentary opening thereof, positive potential will be supplied from battery through the contact pair, over the conductor 64 and over the branching conductor 67 to the grid of the tube 68. The tube 68 will be rendered conducting. Upon the tube 68 becoming conducting its anode potential will drop, resulting in a negative potential pulse appearing on the conductor 69 and causing the left-hand portion of the tube 70 to be rendered nonconducting. At this time the anode potential of the left-hand portion of the tube 70 will increase, with similar affect on the conductor connected to the grid of the right-hand portion of the tube 70, and thus this portion of the tube 70 will be rendered conducting. The anode potential of the right-hand portion of the tube 70 will decrease, causing a similar condition on the connecting conductor 71. However, such decreased potential on the conductor 71 and the screen grid of the tube 39 to which it is connected will have no affect on the tube, as it is nonconducting at such time.

The two portions of the tube 70 act as a univibrator, with the right-hand portion remaining conducting, once in such state, only until the charge leaks from the condenser 80, after which the two portions of the tube will return to their prior conditions automatically with the left-hand portion conducting and the right-hand portion nonconducting.

It should be remembered at this point that mention was made that the output circuit of the tube 41 was connected by the conductor 75 through the resistor to the grid circuit of the left-hand portion of the tube 70. Therefore, as far as tube 41 is concerned, either a ground or positive potential will be on the conductor 75, depending on whether the tube 41 is nonconducting or conducting, respectively. Such a differential of potential will cause a difference in the interval of time necessary for the charge to leak from the condenser 80, for a purpose which will be described more in detail hereinafter.

At such time as the negative charge leaks from the condenser 80 the left-hand section of the tube 70 will again be rendered conducting, resulting through its anode connection to the grid of the right-hand portion thereof in the latter portion of such tube being rendered nonconducting. At this time the anode potential of the right-hand portion of the tube 70 will increase rapidly resulting in a positive impulse being impressed over the conductor 71 and through the appropriate condenser to the normally negatively biased screen grid of the tube 39.

As it was assumed that the tube 41 was conducting and its output circuit was supplying a conditioning potential over the conductor 49 to the control grid of the tube 39, the tube 39 will be rendered conducting upon the subsequent potential impression on the conductor 71 to its screen grid, just mentioned.

Upon the tube 39 becoming conducting positive potential will be impressed from its ouput cathode circuit over the common conductor 72 and through appropriate resistors to the control grids of the output gas tubes 52 to 58, inclusive. At this time any of the tubes 52 to 58, inclusive, will be rendered conducting which has received a conditioning potential on its screen grid, over the individual conductors 51 from the output circuits of the gas storage tubes 23 to 29, inclusive. Thus the components of the signal which had been received as individual impulses over the conductors 12 will now be transferred to the tubes 52 to 58, inclusive.

It should be pointed out that in the event that a spacing or no-current impulse had been received there would have been no change of conduction in the tubes 13 to 19, inclusive, and likewise no conduction of the associated tubes 23 to 29, inclusive. Under this condition it is obvious that there will be no conduction of the tube 39 and no supplying of operating potential to the control grids of the tubes 52 to 58, inclusive, as the tube 41 will not be rendered conducting to supply a conditioning potential to the tube 39.

During the interval that the tube 39 is conducting, the potential impressed from its output cathode circuit to the common conductor 72 is also impressed through an appropriate condenser and resistor to the normally negatively biased grid of the normally nonconducting right-hand section of the twin triode vacuum transfer timer tube 73. The right-hand section of the tube 73 will be rendered conducting by the application of the potential impulse, and through its anode connection to the grid of the normally conducting left-hand section thereof will cause such section to be rendered nonconducting. Such changed status of the tube sections will be retained for an interval during which the negative potential leaks off from the anode to grid connecting condenser, and thereafter the conduction will be reversed; that is, the left-hand section will again be rendered conducting and the right-hand section nonconducting. Sufficient time is allowed for the potential leakage of the connecting condenser to insure reception of a complete signal in the tubes 23 to 29, inclusive, and the transfer thereof to the tubes 52 to 58, inclusive, even though such transfer should begin almost instantaneously after the reception of a first code impulse of a character group with the consequent operation of the tubes 41 and 39.

At such time as the right-hand section of the tube 73 is rendered nonconducting potential will rapidly increase on its anode circuit and will be impressed over the conductor 74 and through the appropriate condenser to the normally negatively biased grid of the normally nonconducting triode tube 76, rendering it conducting. The tube 76 is in effect a biased amplifier. At such time as the tube 76 is rendered conducting, which is momentary only because of the differentiating condenser in the conductor 74, potential in its anode circuit will decrease with a similar decrease in potential on the conductor 77 connected thereto. The conductor 77 is connected through an appropriate resistor and normally supplies positive bias to the grids of the two sections of the normally conducting tube 38. Thus, when the tube 76 conducts the two portions of the tube 38 will be rendered nonconducting and as the tube is a cathode follower, a similar decrease in potential will occur on the cathode circuits thereof.

At such time as the sections of the tube 38 are rendered nonconducting potential will no longer be impressed over the common conductor 37 to the anodes of the gas storage tubes 23 to 29, inclusive. This, if any of these tubes had been conducting, indicative of a marking impulse stored therein, such tubes will now be rendered nonconducting. The effect of this is simply to release the stored signal in the storage tubes in readiness for the receipt of a subsequent signal on the conductors 12 and transfer from the receiving tubes 13 to 19, inclusive. It should also be noted that the switch 93 in the grid circuit of the tube 76 may be closed manually, resulting in that tube being rendered conducting and the tube 38 nonconducting. The switch 93 has been included so that it is possible to render the tubes 23 to 29, inclusive, 41 and 39 nonconducting if necessary, particularly when the circuit is first put to use.

Further, as potential no longer exists on the conductor 37 the anode potential for allowing conduction of the tubes 39 and 41 will no longer be present causing both of these tubes to be rendered nonconducting, in readiness for receipt of the next code signal and transfer thereof to the output tubes. It should of course be kept in mind that the signal stored in the storage tubes will not be released until such time as the transfer is effected to the output tubes 52 to 58, inclusive.

During the discussion above of the transfer of conduction to the output gas tubes 52 to 58, inclusive, it must be kept in mind that not only is it necessary to have a conditioning potential upon the conductors 51 and an operating potential on the common conductor 72, but also the contact pair 63 must be closed. This is necessary in order that a complete circuit may be established which may be traced from positive battery, through the contact pair 63, over the common conductor 64 to the anodes of the tubes 52 to 58, through the tubes, over conductors 78 and through the windings of individual punch magnets 79 to ground. Thus, during this interval not only are the output tubes 52 to 58 rendered conducting in accordance with the permuted signal, but the appropriate punch selector magnets 79 are likewise energized to set the perforating mechanism in readiness to perforate the signal.

During the time that the contact pair 63 is closed a circuit is also established which may be traced from positive battery, through the closed contact pair 63, over the common conductor 64 to the anode of the tape feed tube 66, through the tube, over the conductor 81 and through the winding of a tape feed magnet 82 to ground. The control grid of the tube 66 is connected to the common conductor 72, which supplies operating potential for the control grids of the output tubes 52 to 58, inclusive, and as the screen grid thereof is at ground potential, at such time after the contact pair 63 is closed that operating potential appears on the conductor 72 the tube 66 will be rendered conducting. The only effect of the tube 66 being rendered conducting is to complete the establishment of the circuit for the energization of the tape feed magnet 82. Accordingly, even though the contact pair 63 be closed, in the event that control grid potential does not exist at the tube 66, such tube may not be rendered conducting and thus no tape feed will occur. This of course is necessary for, as stated previously, the shaft 62 and perforating mechanism operate irrespective of the receipt of code signals in the electronic control circuits. Therefore, by utilizing the tube 66 the tape will only be stepped at such time as a signal has been received by the instant apparatus, which at times may reduce considerably the amount of tape utilized.

During the previous description of the operation of the apparatus it was mentioned that the conductor 75 might be at two potential levels: that is, either the ground level or a positive level. Further, it was indicated that this provided for different times necessary for the leakage of potential from the condenser 80 upon the right-hand portion of the tube 70 being rendered conducting. This in turn alters the times at which the positive potential will be impressed on the conductor 71 serving as operating potential for the transfer tube 39.

It should be remembered at this time that the perforating mechanism operates independently of the signals delivered to the electronic control circuit described herein and that therefore positive potential on the conductor 67 resulting from closure of the contact pair 63 may be impressed through the tube 68 to the grid of the left-hand portion of the tube 70 at varying times with respect to the receipt of code signal impulses on the conductors 12. Accordingly, if the tube 41 is conducting, signifying the receipt of a code signal in the storage tubes 23 to 29, inclusive, it may be understood that it is not necessary that the transfer to the output tubes be delayed for any appreciable length of time, but in fact should be facilitated. On the other hand, if no such signal has been received, but one is anticipated, it is desirable that it be immediately transferred from storage to output stages, and if the right-hand portion of the tube 70 is held in the conducting condition for a longer period of time, the tube 41 may become conducting during this period, with the appropriate action then taking place.

In view of these facts, the cathode potential output of the tube 41, as mentioned previously, is impressed on the conductor 75 to the grid of the left-hand portion of the tube 70. Under these conditions and upon receipt of positive potential to the grid of the right-hand section of the tube 70 from a subsequent closure of the contact pair 63, the resulting potential impressed to the condenser 80, as described previously, will leak off faster than under the opposite condition, and when the right-hand portion of the tube 70 then ceases conducting the tube 39 will be rendered conducting at an earlier time than if the tube 41 were non-conducting. This will cause the early transfer of signals from storage to output stages, with the subsequent releasing of the storage tubes 23 to 29, inclusive, in anticipation of the reception of the next code signal permutation. If the latter signal were earlier than normal, for a number of reasons, it otherwise might be received while the storage tubes were being released and the character would then be lost.

If instead of the condition described above the tube 41 is not conducting, signifying that no marking impulse has been received in the primary storage circuits, the grid of the left-hand section of the tube 70 will be at ground potential. Under this condition the receipt of positive potential on the grid of the right-hand portion of the tube 70 resulting from closure of the contact pair 63 causes a charge to leak off from the condenser 80. However, as the grid return circuit is at ground potential the charge will not leak off as rapidly as when the conductor 75 is at a positive value and therefore a longer interval of time will be available during which it would be possible to receive a code signal in the tubes 23 to 29, inclusive, with the immediate transfer thereof to the tubes 52 to 58, inclusive. Under these conditions, signals which occur earlier than nornal are immediately accommodated without loss. The normal sequence of timing during continuous operation is that the time of operation of the storage tubes 23 to 29, inclusive, decreases regularly with the tube 70 operating for the shortest interval until the tube 41 begins to be first rendered conducting during the mentioned interval. This interval then increases until the cycle occurs on which the tube 39 just fails to fire because the tube 41 did not prime it in time. The punch accordingly makes one cycle with none of its magnets energized, during which time the character remains in the storage tubes. With the tube 41 conducting, the tube 70 next operates for the short interval and the entire process is repeated.

By reference to Fig. 5 it is believed that the above conditions may be seen in graph 96 wherein it is shown that the interval of conduction of the right-hand portion of the tube 70 varies. Further, graph 96 illustrates the conduction of the right-hand portion of the tube 70 with respect to the impulse received, due to the closure of the contact pair 63 shown in graph 97, and that the latter occurs at a fixed rate while the received signals shown on graph 98 occur at a different rate. It may be seen that the period of conduction of the transfer tube 39, shown in graph 99, is invariable with respect to duration but that its time of occurrence varies in accordance with the operating period of the overlap tube 70, shown in graph 96.

Fig. 5 also illustrates the operating times of various other of the components of the apparatus with respect to those already mentioned and with respect to each other. For instance, graph 101 illustrates the interval of operation of the receiving tubes 13 to 19, inclusive, graph 102 illustrates the interval of operation of the tube 32, graph 103 the operation of the tube 36, graph 104 the operation of the storage tubes 23 to 28, inclusive, and the tube 41, graph 106 the operation of the tube 73, and graph 107 the operation of the tubes 52 to 58, inclusive, and the magnets 79 and 82. It is believed that it is not necessary to describe further in detail the various illustrated graphs but that instead, during the description of the apparatus, reference to them will result in a better understanding of the method of operation and the timing thereof of the various elements forming the invention.

It must be remembered that during the above description of the operation of the apparatus it was stated that in the event that no code signals were received, or rather no marking impulses in a code signal, that the tube 41 would not be energized and that therefore the sequence of operation necessary for tape feed through conduction of the tube 66 would not occur. Such a condition operates satisfactorily in many modes of telegraph communication where it is not desired to transmit blank signal conditions and therefore it is not necessary to incorporate them in the perforated medium. This is particularly true of systems where blank signals are transmitted during periods of no signal transmission over the signalling channel.

However, in certain methods of transmission, and particularly for cipher traffic, it is necessary that all signals be transmitted over the signal channel. Accordingly, it is desirable that provision be made for apparatus to be able to operate under both modes of communication where blank signals are either deleted or included. Accordingly, as a further feature of the invention means have been provided to allow the reception, perforation and thus subsequent transmission of blank signals.

With reference to Fig. 3, it may be remembered that it was mentioned that with the switch 86 in the illustrated position a conductor 84 extended from the connector 11 to the normally negatively biased control grid of the tube 83, the screen grid of which is at cathode potential. In operations utilizing the tube 83 it is contemplated that a predetermined concluding control pulse will be impressed invariably for each signal received, including blank signals, on the conductor 84 and to the control grid of the tube 83. Thus, the tube 83 will conduct invariably for every signal received.

The cathode output circuit of the tube 83 is connected to the common conductor 31 which is connected to the grid of the right-hand portion of the tube 32, and thus every time the tube 83 conducts the right-hand portion of the tube 32 will be rendered conducting. This will initiate the operation of the control circuit, and subsequently cause the tube 41 to be rendered conducting to cause conduction of the tape feed tube 66 and feed magnet 82 when the contact pair 63 opens and is subsequently closed. Thus, the apparatus will operate to include blank conditions in the perforated tape.

It may be understandable that in the description immediately above a control pulse to the tube 83 could be utilized for blank signals only, as any other character would contain at least one marking condition and so cause operation of one or more of the tubes 13 to 19, inclusive.

Similarly, it is also understandable that in operations where it is not necessary to include blank conditions the tube 83 and the control pulse per character may still be received to insure that the tape is stepped for each character received, whether received correctly or not.

It may be remembered that initially it was mentioned that by a second mode of operation the control circuit could be utilized to receive random signals, that is where all character impulses are not necessarily received within a single cycle of the perforator, and yet cause the proper perforation thereof. In order for such operation the switches 86 and 34 must be repositioned to make contact with their associated right-hand contact points, and the following description will assume such a setting has been made. Also, for operation under this mode it is necessary that a control pulse be transmitted for each character and be received on the conductor 84. The control or extra pulse must occur invariable after all of the signals impulses have been received by the tubes 13 to 19, inclusive, regardless of the sequence or rapidity of receipt of such impulses.

If it be assumed that a signal comprising a plurality of impulses has been received in the tubes 13 to 19, inclusive, those tubes will react as described previously, with the ones receiving marking impulses being rendered conducting. It is immaterial as to sequence of receipt of impulses in the tubes 13 to 19, or as to rapidity of of receipt, as long as the control pulse is received subsequent to all code impulses, as will appear hereinafter.

Upon one or more of the tubes 13 to 19 being rendered conducting, assuming the signal received is not a blank signal, potential will be impressed to the common conductor 31 and to the grid of the right-hand section of the tube 32. The tube 32, acting as a univibrator, will operate as described previously, but this time will have no effect on the tube 36 as the interconnecting conductor 33 will be open at the switch 34, and thus will have no effect at all on the operation of the control circuit. The tubes 13 to 19 which are conducting will also cause potential to be applied to the associated conductors 20, with associated ones of the tubes 23 to 29, inclusive, being conditioned for operation or conduction, all as was described previously.

After all of the code impulses have been received the control impulses will be impressed over the conductor 84, through the switch 86, over the conductor 87, and through the switch 34 to the grid of the left-hand portion of the tube 36. This will result in this portion of the tube being rendered conducting.

The result of the left-hand portion of the tube 36 being rendered conducting is similar to that described above, in that the tube 43 will be rendered conducting to transfer the signal selection to the storage tubes 23 to 29, inclusive, and to cause the tube 41 to be rendered conducting, and the tube 46 will be rendered conducting to render the tube 22 nonconducting and release all conducting receiving tubes 13 to 19, inclusive. The conduction of the tube 41 allows cooperation with the perforator equipment to transfer the selection at the proper time to the output tubes 52 to 58, inclusive, and to the magnets 79. Thus, after the control impulse causes conduction of the left-hand portion of the tube 36 the operation of the invention is the same as that described for the simultaneous receipt of impulses.

If a blank signal condition had been received under this mode of operation the control impulse would still be received to release the circuitry for operation, with a resultant stepping of the tape only, all as described previously.

Reference may be had to Fig. 6 wherein may be seen in graph 108 the receipt of the code impulses and in graph 109 the subsequent receipt of the control impulses. Thereafter the other circuit timing elements are the same as in the previously described mode of operation, starting with graph 103 showing the output of the tube 36, and have been numbered similarly.

It may be understood that the switches 86 and 34 allow the circuit to operate without use of the univibrator tube 32. This is necessary, for otherwise the tube 32 would operate upon the receipt of any one marking impulse, and if all of the code impulses were not received within a very short time interval the transfer to the tubes 23 to 29 or to the magnets 79 could occur before all of the impulses were received, resulting in the perforation of an incorrect signal.

The manual push button switches 88 have been provided in the control grid circuits of the tubes 13 to 19, inclusive, for the purpose of allowing manual signals to be set up for perforation in the tape or medium. These signals may be used for routing purposes, etc., when later utilizing the perforated material. In any event, by manually closing one or more of the switches 88 the associated ones of the tubes 13 to 19 will be rendered conducting. After the complete selection is made in the tubes 13 to 19 the manually operable push button switch 91 will be closed, causing positive potential to be impressed over the conductor 89 to the grid of the left-hand portion of the tube 36, causing that portion of the tube to be rendered conducting. Thereafter the subsequent operation of the circuitry will be as described above. A subsequent signal may be set manually in the tubes 13 to 19, inclusive, as soon as they have been released by operation of the tube 46.

The manual signal setting operation may only be done under the random mode of operation, with the switches 86 and 34 in their right-hand positions, for otherwise the normal sequential setting of the contacts 88 would be too slow and incomplete signals would be perforated. It is contemplated that the switches 88 and 91 will be closed momentarily only, for otherwise repeat signals would be perforated.

From the above operational description of the control circuit and perforating equipment it may be understood readily that the apparatus may operate not only from received telegraph signals, but may have the tubes 13 to 19, inclusive, set from any device, such as computers, etc., which have information to be stored in perforated form, which operate very rapidly, and which can generate a control pulse if the setting is not made in the tubes 13 to 19 substantially simultaneously.

While specific embodiments of the invention have been described utilizing specific circuitry and components, it is obvious that the invention is not limited to such specific circuitry and components, nor specific embodiments, but instead alterations and additions may be made within the scope and spirit of the invention.

What is claimed is:

1. In combination with a continuously operating recorder provided with timing means and recorder control means and a source of code impulses, means for receiving said code impulses substantially simultaneously, storage means, means controlled by said receiving means for transferring the selection from said receiving means to said storage means, output means, and means controlled by said timing means and said transfer means for transferring the selection in said storage means to said output means for controlling operation of said recorder control means.

2. In combination with a continuously operating recorder provided with timing means and recorder control means and a source of code impulses, means for receiving said code impulses substantially simultaneously, storage means, means controlled by said receiving means for transferring the selection from said receiving means to said storage means, means controlled by said transfer means for releasing operation of said receiving means after the transfer has been effected, output means, means controlled by said timing means and said transfer means for transferring the selection from said storage means to said output means for controlling operation of said recorder control means, and means controlled by said last-mentioned transfer means for releasing operation of said storage means after the transfer has been effected.

3. In combination with a continuously operating recorder provided with timing means and recorder control means and a source of code signals composed of marking and spacing permutations, means for receiving said code signals substantially simultaneously, storage means, means controlled by the receipt of a code signal containing at least one marking permutation in said receiving means for transferring the selection from said receiving means to said storage means, and means controlled by said storage means, said transfer means and said timing means for controlling operation of said recorder control means.

4. A control circuit in combination with a continuously operating signal controlled recorder having timing means and recorder selector means, including a plurality of receiving means equal in number to the code impulses of received signals for receiving such impulses substantially simultaneously, storage means, means controlled by said receiving means for transferring the selection from said receiving means to said storage means, output means, means controlled by said timing means and said transfer means for transferring the selection from said storage means to said output means for controlling operation of said recorder selector means, and variable means for timing said last-mentioned transfer with respect to the condition of said storage means.

5. In combination with a continuously operating mechanism for medium recording having timing means and recorder selector means and a source of code impulses, means for receiving said code impulses substantially simultaneously, storage means, means for transferring the selection from said receiving means to said storage means, output means, means controlled by said timing means and said transfer means for transferring the selection from said storage means to said output means for controlling said recorder selector means, and means controlled by said timing means and said last-mentioned transfer means for imparting step-by-step motion to said medium.

6. In combination with a continuously operating recorder having timing means and recorder selector means and a source of signals each composed of marking or spacing intelligence impulses and a control impulse, means for receiving said intelligence impulses and said control impulse substantially simultaneously, storage means, means for transferring the selection of intelligence impulses from said receiving means to said storage means, means controlled by the receipt of a marking intelligence impulse or of said control impulse in said receiving means for releasing said transfer means for operation, and means controlled by said storage means, said transfer means and said timing means for controlling operation of said recorder selector means.

7. In combination with a continuously operating recorder having timing means and recorder selector means, means for receiving intelligence code signal impulses substantially simultaneously, storage means controlled by said receiving means, means for transferring the selection from said receiving means to said storage means, means responsive to the receipt of a code signal having at least one marking impulse by said receiving means for releasing said transfer means for operation, means responsive to the receipt of a code signal having at least one marking impulse or of a control impulse with the code signal impulses for releasing said transfer means for operation, means for selecting one or the other of said transfer releasing means for operation, and means controlled by said storage means, said transfer means and said timing means for controlling the operation of said recorder selector means.

8. In combination with a continuously operating recorder provided with timing means and recorder control means and a source of code signal impulses, means for receiving said code signal impulses substantially simultaneously, storage means, means controlled by said receiving means for transferring the selection from said receiving means to said storage means, output means, and means including a delay circuit controlled by said transfer means and said timing means for transferring the selection in said storage means to said output means for controlling operation of said recorder control means, said delay circuit ensuring the transfer of a complete code signal.

9. In combination with a continuously operating recorder provided with timing means and recorder control means and a source of successive code signals, means for receiving the impulses of individual code signals substantially simultaneously, storage means for storing individual signals successively, means controlled by said receiving means for transferring the selection from said receiving means to said storage means, output means, and means operating variably controlled by said transfer means and said timing means for transferring the stored code signal from said storage means to said output means prior to the transfer of the succeeding code signal to said storage means for controlling operation of said recorder control means.

10. A control circuit in combination with a continuously operating signal controlled recorder having timing means and recorder selector means and a source of code signals each composed of intelligence impulses and a succeeding control impulse, including means for receiving said intelligence impulses and said control impulse at random times, storage means, means for transferring the selection of intelligence impulses from said receiving means to said storage means, means controlled by the receipt of said control impulse in said receiving means for releasing said transfer means for operation, and means controlled by said storage means, said transfer means and said timing means for controlling operation of said recorder selector means.

11. In combination with a continuously operating recorder provided with timing means and recorder control means and a source of code signals each composed of intelligence impulses and a succeeding control impulse, means for receiving said intelligence impulses and said control impulse at random times, storage means, means for transferring the selection of intelligence impulses from said receiving means to said storage means, means controlled by the receipt of said control impulse in said receiving means for releasing said transfer means for operation, output means, and means controlled by said timing means and said transfer means for transferring the selection in said storage means to said output means for controlling operation of said recorder control means.

12. In combination with a continuously operating recorder provided with timing means and recorder control means and a source of code signals each composed of intelligence impulses and a succeeding control impulse, means for receiving said intelligence impulses and said control impulse at random times, storage means, means for transferring the selection of intelligence impulses from said receiving means to said storage means, means controlled by the receipt of said control impulse in said receiving means for releasing said transfer means for operation, output means, means controlled by said timing means and said transfer means for transferring the selection in said storage means to said output means for controlling operation of said recorder control means, and variable means for timing said last-mentioned transfer with respect to the condition of said storage means.

13. In combination with a continuously operating recorder provided with timing means and recorder selector means and a source of code signals each composed of intelligence impulses and a succeeding control impulse, means for receiving said intelligence impulses and said control impulse at random times, storage means, means controlled by the receipt of said control impulse in said receiving means for transferring the selection of intelligence impulses from said receiving means to said storage means, means controlled by said transfer means for releasing operation of said receiving means after the transfer has been effected, and means controlled by said storage means, said transfer means and said timing means for controlling operation of said recorder selector means.

14. In combination with a continuously operating recorder provided with timing means and recorder control means and a source of code signals each composed of intelligence impulses and a succeeding control impulse, means for receiving said intelligence impulses and said control impulse at random times, storage means, means controlled by the receipt of said control impulse in said receiving means for transferring the selection of intelligence impulses in said receiving means to said storage means, means controlled by said transfer means for releasing operation of said receiving means after the transfer has been effected, output means, means controlled by said timing means and said transfer means for transferring the selection from said storage means to said output means for controlling operation of said recorder control means, and means controlled by said last-named transfer means for releasing operation of said storage means after the transfer has been effected.

15. In combination with a continuously operating mechanism for medium recording having timing means and recorder control means and a source of code signals each composed of intelligence impulses and a succeeding control impulse at random times, means for receiving the code signals, storage means, means controlled by the receipt of said control impulse in said receiving means for transferring the selection of intelligence impulses from said receiving means to said storage means, output means, means controlled by said timing means and said transfer means for transferring the selection from said storage means to said output means for controlling operation of said recorder control means, and means controlled by said timing means and said last-named transfer means for imparting step-by-step motion to said medium.

16. In combination with a continuously operating recorder having timing means and recorder selector means, means for receiving simultaneously a signal composed of marking or spacing intelligence impulses and a control impulse or randomly a signal composed of marking or spacing intelligence impulses and a subsequent control impulse, storage means, means for transferring the selection of intelligence impulses from said receiving means to said storage means, means responsive to the receipt of a marking intelligence impulse or said control impulse of the simultaneously received signals for releasing said transfer means for operation, means responsive to the receipt of said control impulse of the randomly received signals for releasing said transfer means for operation, means for selecting one or the other of said transfer releasing means for operation, and means controlled by said storage means, said timing means and said transfer means for controlling the operation of said recorder selector means.

17. In combination with a continuously operating recorder having timing means and recorder control means, a plurality of electron discharge devices, manually operable means for selectively causing operation of said discharge devices, storage means, means for transferring the selection from said discharge devices to said storage means, manually operable means for releasing said transfer means for operation, and means controlled by said storage means, said transfer means and said timing means for controlling operation of said recorder control means.

18. In combination with a continuously operating recorder provided with timing means and recorder selector means and a source of code signals each composed of intelligence impulses and a succeeding control impulse, means for receiving said intelligence impulses and said control impulse at random times, storage means, means controlled by the receipt of said control impulse in said receiving means for transferring the selection of intelligence impulses from said receiving means to said storage means, manually operable means for releasing operation of said receiving means, and means controlled by said storage means, said transfer means and said timing means for controlling operation of said recorder selector means.

19. In combination with a continuously operating recorder provided with timing means and recorder control means and a source of code signals each composed of intelligence impulses and a succeeding control impulse, means for receiving said intelligence impulses and said control impulses at random times, storage means, means controlled by the receipt of said control impulse in said receiving means for transferring the selection of intelligence impulses from said receiving means to said storage means, output means, means controlled by said timing means and said transfer means for transferring the selection in said storage means to said output means for controlling operation of said recorder control means, and manually operable means for releasing operation of said storage means.

RANSOM D. SLAYTON.

No references cited.